Jan. 27, 1970 W. POLILLO 3,492,649

REMOTE METER READING DEVICE HAVING BINARY CODING OF METER READING

Filed March 17, 1967 7 Sheets-Sheet 1

INVENTOR:
WILLIAM POLILLO
BY John R. Nesbitt
ATTORNEY

INVENTOR:
WILLIAM POLILLO
BY John R. Nesbitt
ATTORNEY

INVENTOR:
WILLIAM POLILLO
BY John R. Nesbitt
ATTORNEY

INVENTOR:
WILLIAM POLILLO

BY John R. Nesbitt
ATTORNEY

INVENTOR:
WILLIAM POLILLO

BY John R. Nesbitt
ATTORNEY

Jan. 27, 1970 W. POLILLO 3,492,649

REMOTE METER READING DEVICE HAVING BINARY CODING OF METER READING

Filed March 17, 1967 7 Sheets-Sheet 6

INVENTOR:
WILLIAM POLILLO

BY John R. Nesbitt
ATTORNEY

Jan. 27, 1970 W. POLILLO 3,492,649

REMOTE METER READING DEVICE HAVING BINARY CODING OF METER READING

Filed March 17, 1967 7 Sheets-Sheet 7

INVENTOR:
WILLIAM POLILLO

BY John R. Nesbitt
ATTORNEY 3,492,649

REMOTE METER READING DEVICE HAVING BINARY CODING OF METER READING

William Polillo, Galesburg, Ill., assignor to Crosstalk, Inc.

Filed Mar. 17, 1967, Ser. No. 623,894

Int. Cl. H04q 7/00

U.S. Cl. 340—151 9 Claims

ABSTRACT OF THE DISCLOSURE

An apparatus with a magnet implanted on the units drum of an electric, gas or water meter and a magnetically actuated switch which actuates simulator drums that simulate the position of the meter dials. Binary encoded contacts on the simulator drums are electrically connected to a scanner wheel which is traversed by a scanner arm that varies the frequency of a signal output generator according to the "open" or "closed" condition of the particular contact on the scanner wheel being sensed. Various electrical circuits permit a "turn on" of the device over a telephone line and provide an automatic disconnect when the meter reading has been transmitted over the telephone line.

An alternate construction permits meter alteration to transmit dial position directly to the scanner wheel omitting the simulator drums.

This invention relates to a remote meter reading device and more particularly to an electro-mechanical device for installation at the meter face which device senses a meter reading and transmits it over telephone lines to the central data recording center, such central data recording center being no part of this invention.

There has long been a need for some simple, accurate and efficient method for remote reading of a meter. Up to the time this invention was made, the best system was a human meter reader. Other systems have been designed and put in use and, when these systems have attained a reasonable degree of reliability, they have always been too expensive in comparison with the cost of a human meter reader for the same job.

The main object of this invention is to provide a meter reading device which is accurate, durable and inexpensive both in initial cost and for maintenance thereof.

The further object of this invention is to associate the meter reading device with the meter so that no mechanical drag of any kind is placed upon the meter so that no recalibration is required when the system is installed on meters already existing in the field. Obviously, recalibration can be an expensive and time consuming procedure.

The objects of this invention are accomplished primarily in one of two ways.

The first way involves a mechanical simulation device which includes a Reed magnetically actuated switch which is positioned in working proximity to the units dial on the meter face on which a magnetic insert has been emplaced and this switch is then used to actuate a stepping relay which operates a simulator units meter drum interconnected by a Geneva gear train or the like, to tens and hundreds to reproduce the positions of the customary three dials on the meter face. Then the positions of the simulator drums are electrically registered by a series of contacts located adjacent the simulator drums for interaction with knife switch contacts on the drums or by a predetermined sequential spacing of conductive points on the drums which are sensed by brushes located adjacent the drums. The contact orientation of these simulator drums is arranged to convert the numeric code on the meter face dials or drums into binary encoded data which is recorded on electrical contacts located on a readout scanner wheel. The electrical contacts on the scanner wheel are traversed by a scanner arm which senses the open (or logical "1" condition as it is sometimes referred to in this invention) or ground (or logical "0" condition as it is sometimes referred to in this invention) condition of the particular electrical contact with which it is in contact. Each of the meter dials has 10 (0 through 9) numeric characters and these characters are reproduced in binary code by various open and ground contact arrangements on the simulator drums and this code is sensed by the use of four switch or brush connections to each drum. Thus, if the first brush senses an "0" position, the second brush senses a "1," the third brush senses a "1" and the fourth brush senses an "0," and assuming the "1s" are arbitrarily selected for numeric weighting, then, using standard binary code whereby the first brush is assigned a value of 1, the second brush is assigned a value of 2, the third brush is assigned a value of 4, and the fourth brush is assigned a value of 8, we see that by counting the assigned values of the brushes in the "1" condition we have encoded the numeric character 6 (as the second and third brushes were in the "1" condition) from the simulator drum into binary code at the scanner wheel.

Since each meter having three dials or drums with 10 numeric characters necessarily requires four connector brushes or knife switches per simulator drum, a total of twelve electrical contacts are taken from the simulator drums for each meter and 12 contacts are required on the scanner wheel for the single purpose of encoding a single meter reading on the scanner wheel. Obviously, if a meter has more than three dials, or more than 10 numeric characters per dial to be read out, or both, the number of brushes and contacts on the scanner wheel will be increased, but this is a simple mechanical expedient and will be obvious to one skilled in the art. The data from several meters can also be encoded on the same scanner wheel in apartment house installations, or wherever several meters are located in proximity to one another, use of a multi-meter scanner wheel will obviously reduce the cost of the meter readout device, per meter being read, over and above the single meter reader device specifically described herein. Other contacts on the scanner wheel can be employed for encoding a customer number and for other purposes relevant and useful in meter interrogation. The scanner arm transmits the "0" or "1" condition sensed as it moves from contact to contact on the scaner wheel to a data output multivibrator through a frequency control device which varies the frequency of the data output multivibrator according to whether an "0" or "1" condition is sensed from the particular contact on the scanner wheel being looked at by the scanner arm at any given moment. The data output multivibrator is connected to a telephone line through an output shaper and driver to make the signal compatible with the telephone system. A disconnect circuit is interposed between the data output driver and shaper and the telephone line and is actuated by a second arm which traverses the scanner wheel. The scanner wheel has a continuous conductive strip thereon which completes the circuit to the telephone line during a readout. As soon as the last contact to be read out by the first arm is passed, the said continuous strip ends and the second arm breaks its connection therewith and this disconnects the entire meter reading device from the telephone line.

Another means of reading the meter makes use of the emplacement of contact takeoffs directly on the meter dials or drums themselves, either in the form of conductive spots, knife switches, or holes in the meter drums for use with photo-electric switches, or any one of a number of similar devices obvious to one skilled in the art. This means of practicing this invention has the obvious advantage of eliminating the need for the Reed switch and the stepping relay and the simulator drums, but it has the obvious drawback, given the current state of the art, that all meter dials or drums for use with this system would need to be modified or replaced and in the case of mechanical contact between the meter drums and the sensing circuit the meter would need to be recalibrated. Obviously, this from of the invention will find its greatest use in the manufacture of new meters specifically adapted for use with the device of this invention.

Figure 1:
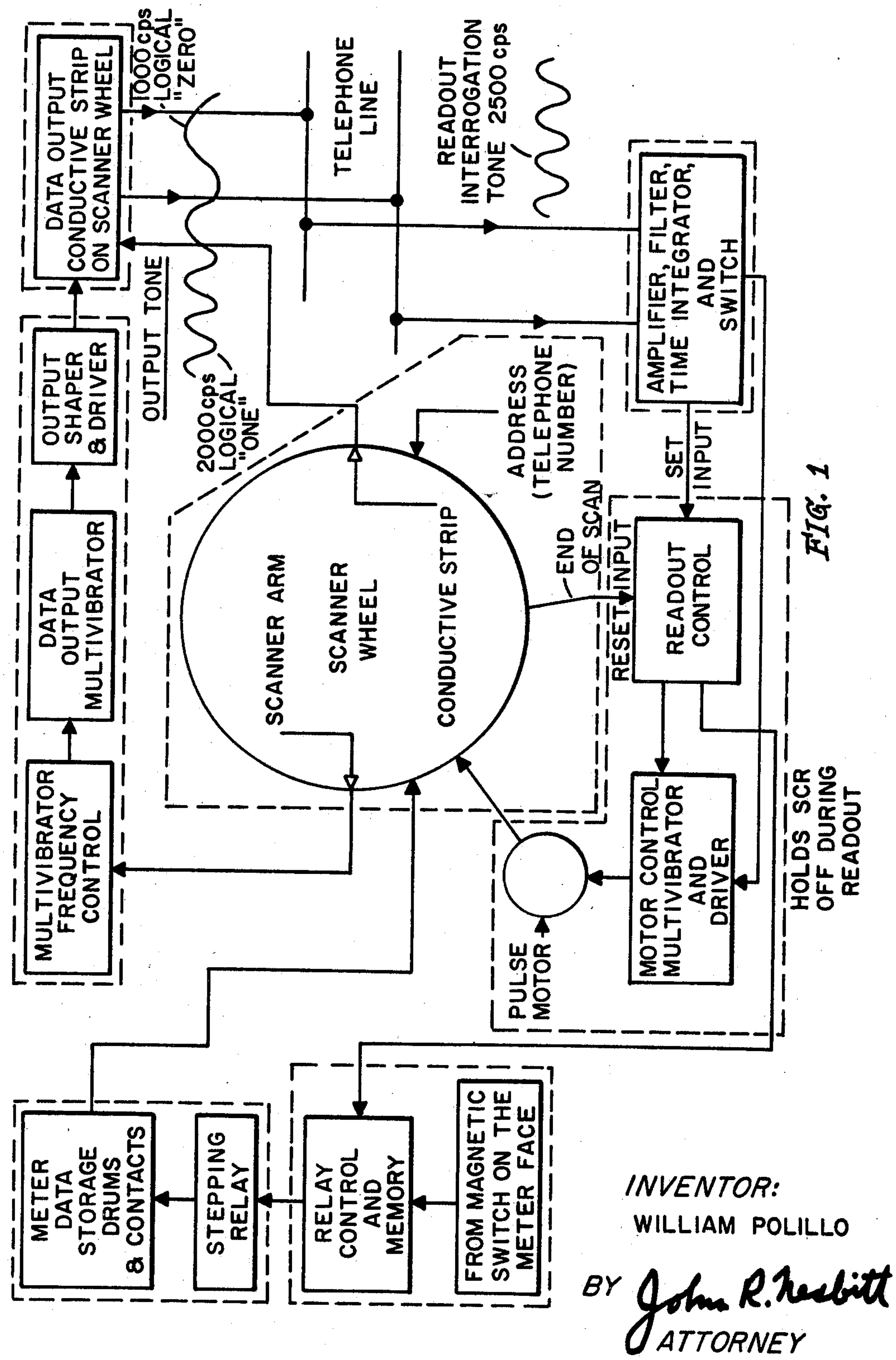
FIGURE 1 is a block diagram of the meter reader of this invention.
Figure 2:
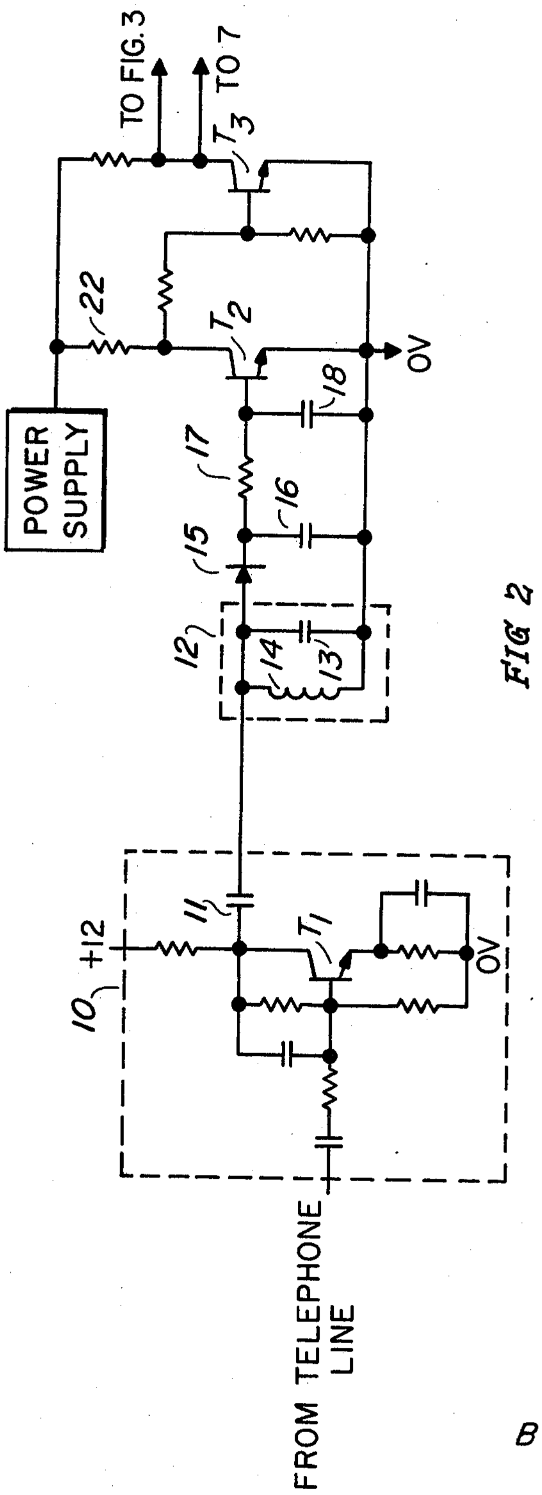
FIGURE 2 is a circuit diagram of the input amplifier, resonant filter, time integrator and switch section of this invention.

The operation of the meter reader of this invention is initiated by dialing the number assigned to the meter selected for interrogation by telephone. If the selected telephone line is not busy, an interrogation tone is applied to the line having a frequency of 2500 cps. When the 2500 cps. signal is applied to the meter reader over the telephone line by dialing the number assigned to the meter, the incoming signal is first received in a transistor amplifier stage of a common type and indicated generally as 10 (See FIGURE 2). Blocking capacitor 11 keeps ringing frequency signals out of the system. A resonant filter circuit 12 of a common type comprised of inductance 14 and capacitor 13 connected in parallel looks at the amplified signal and the values of the capacitor 13 and inductance 14 determine the frequency accepted (2500 cps. is used in one embodiment of this invention but other frequencies can of course be used by adjusting the values of coil 14 and capacitor 13). Diode 15 in combination with capacitor 16 form a half-wave rectifier which converts the high amplitude AC signal passed through the resonant filter circuit into a half-wave rectified DC signal. Since frequency components in the normal voice spectrum will be within the bandwidth of the filter circuit 12, a time integrator capacitor 18 is connected between the base of transistor $T_2$ and ground and assigned a value that requires the application of a 2500 cps. signal (or other preselected frequency) for a period of time longer than could possibly occur by vocal conversation on the line before capacitor 18 discharges. When capacitor 18 is sufficiently charged, it turns on $T_2$. Resistor 22 is a collector load resistor for $T_2$ which serves to build voltage between the power supply and the base of $T_2$. Resistor 17 is a base input resistor for $T_2$ which generates turn-on current for $T_2$ when time integrator capacitor 18 charges. Collector load resistors and base input resistors are common in the art and they function in the normal manner in operation of $T_2$. Many other collector load and base input resistors are shown in the circuit diagrams of this invention but they are not assigned numerals or described unless they operate in some unusual manner that must be described in order to understand this invention.

When $T_2$ is turned on, the $T_2$ collector almost goes to ground and this turns off transistors $T_3$ (which was "on" when the interrogation cycle was initiated). When $T_3$ turns off its collector goes positive and this in turn turns on transistor $T_4$ (see FIGURE 3) which forms half of a bistable multivibrator indicated generally as 7. Transistor $T_5$ forms the other half of said multivibrator. The collector of $T_5$ is connected to the base of $T_4$ through regenerative resistor 26, and the base of $T_5$ is connected to the collector of $T_4$ through feed back resistor 32, and these cross coupling resistors serve to cause $T_4$ and $T_5$ to operate as a flip-flop oscillator. This flip-flop indicated generally as 7 is sometimes referred to herein as the readout control flip-flop. The collector of $T_4$ is connected to the base of transistor $T_6$. $T_6$ is "on" before interrogation and functions to clamp off transistor $T_9$ which is connected to the output side of free running multivibrator 8 (which runs continuously) as long as $T_4$ is not turned on. When $T_4$ is turned on by an interrogation tone of the proper frequency and duration $T_6$ is turned off, thereby releasing its clamp on $T_9$.

As long as $T_9$ is clamped, the pulses from continuously running multivibrator 8 are not passed through or reflected at the collector of $T_9$, but when the clamp is released $T_9$ functions as a switch and switches on and off as multivibrator 8 oscillates. This switching of $T_9$ is used to drive a pulse motor 6. Transistor $T_9$ is connected to motor 6 through transistor $T_{10}$ to attain gain sufficient to properly run the pulse motor 6.

Figure 4:
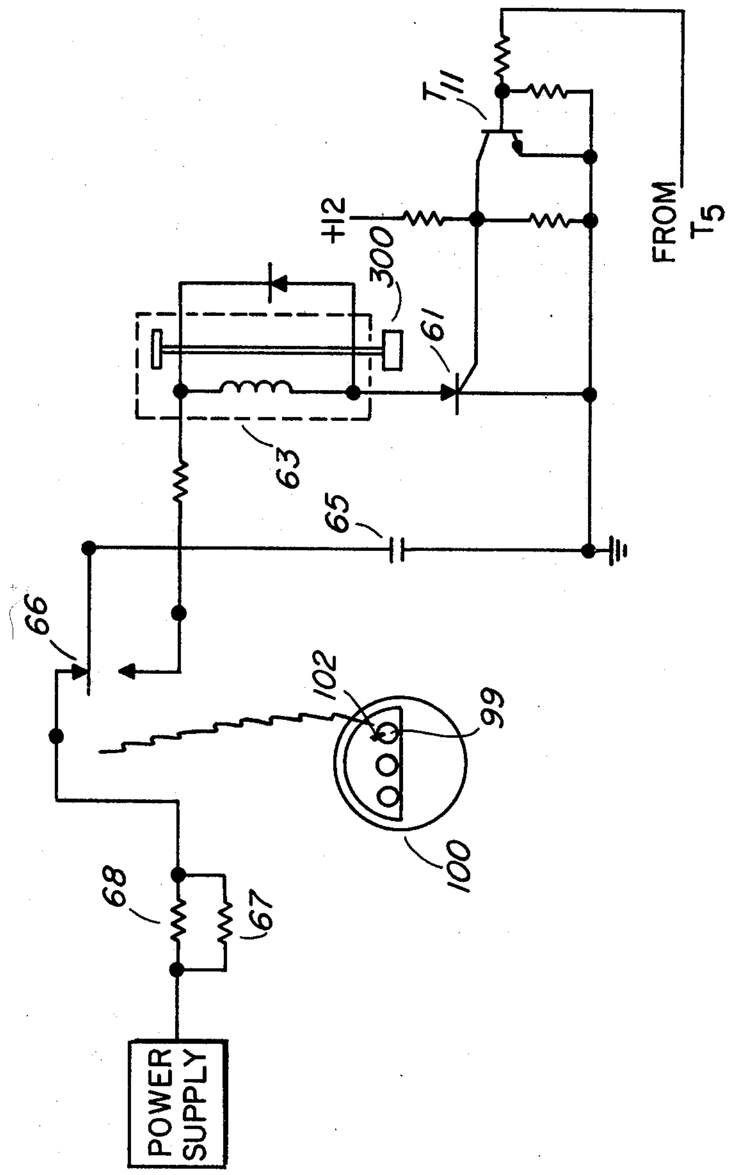
FIGURE 4 is a circuit diagram of the stepping relay control and memory circuit and meter face.

The collector of $T_5$ is connected to the base of $T_{11}$ transistor and when $T_5$ is turned off (by the initial interrogation signal) $T_{11}$ is turned on (its collector goes to ground). This grounds the gate of silicon control rectifier 61. As shown in FIGURE 4, the power supply is connected through resistors 67 and 68 to switch 66, and then in parallel to storage capacitor 65 and stepping relay solenoid 63. When the meter reading device is not being interrogated, and hence the gate of SCR 61 is not grounded, upon each switch 66 closure solenoid 63 actuates stepping relay 300 and the simulator elements (of the type shown in FIGURES 5, 6 and 7) are advanced by a gear train 250, or other gear arrangement, to duplicate the position of the dials or drums at the meter face.

During interrogation the output of the meter reader could be garbled if switch 66 closed. Therefore, during such interrogation, the gate of SCR 61 is grounded to prevent actuation of stepping relay 300. However, it is essential to record any closure of switch 66 which occurs during a meter readout and hence storage capacitor 65 serves as a "memory" and accumulates a charge during readout and discharges immediately upon $T_{11}$ switching back to an "off" condition—this occurs when the readout is completed and the device is reset as described more fully hereinafter. When storage capacitor 65 discharges, the relay 300 is stepped another increment thereby recording th closure of switch 66 during readout. Component values may be selected so that a readout cycle covers about 2.5 seconds. Capacitor 65 is selected to accumulate and hold a charge, before discharge, for about 10 seconds, thereby assuring actuation of the relay after the readout (provided that the switch circuit closes during the readout). It takes at least 60 seconds to consume one kwh., even under heavy loads, so there is no chance that more than one closure of switch 66 (which is actuated by a rotating magnetic element 102 affixed to the units dial 99 of the meter being read) could be effected during thc readout.

Using a form "C" Reed switch has the advantage of charging capacitor 65 while in its normal position and applying the change to the stepping relay when operated by the magnet. This action prevents the stepping relay from being operated for long periods of time in the event usage should stop while the Reed switch is closed. Of course, if no closure of switch 66 occurs during the readout, capacitor 65 will receive no charge, and no discharge will occur when the readout is completed.

When the clamp on $T_9$ is removed, pulse motor 6 starts to run and this motor drives scanner arm 150 which has a first portion 152 adapted to traverse contacts 154 which are spaced peripherally about the scanner wheel 160. Contact 156 is wired to the reset circuit, which will be described hereinafter, and this stops the scanner motor and leaves the scanner arm in initial position to begin the scan upon receipt of the next interrogation signal. A second portion 159 of the scanner arm rides on conductive strip 162 on the scanner wheel, said strip being positioned so that the brush 151 on portion 159 of the scanner arm makes contact with said strip simultaneously (or just before) the brush 153 on the scanner arm contacts the first contact 154. When brush 151 moves off strip 162 the output of the device is disconnected from the telephone line.

Figures 5, 6:
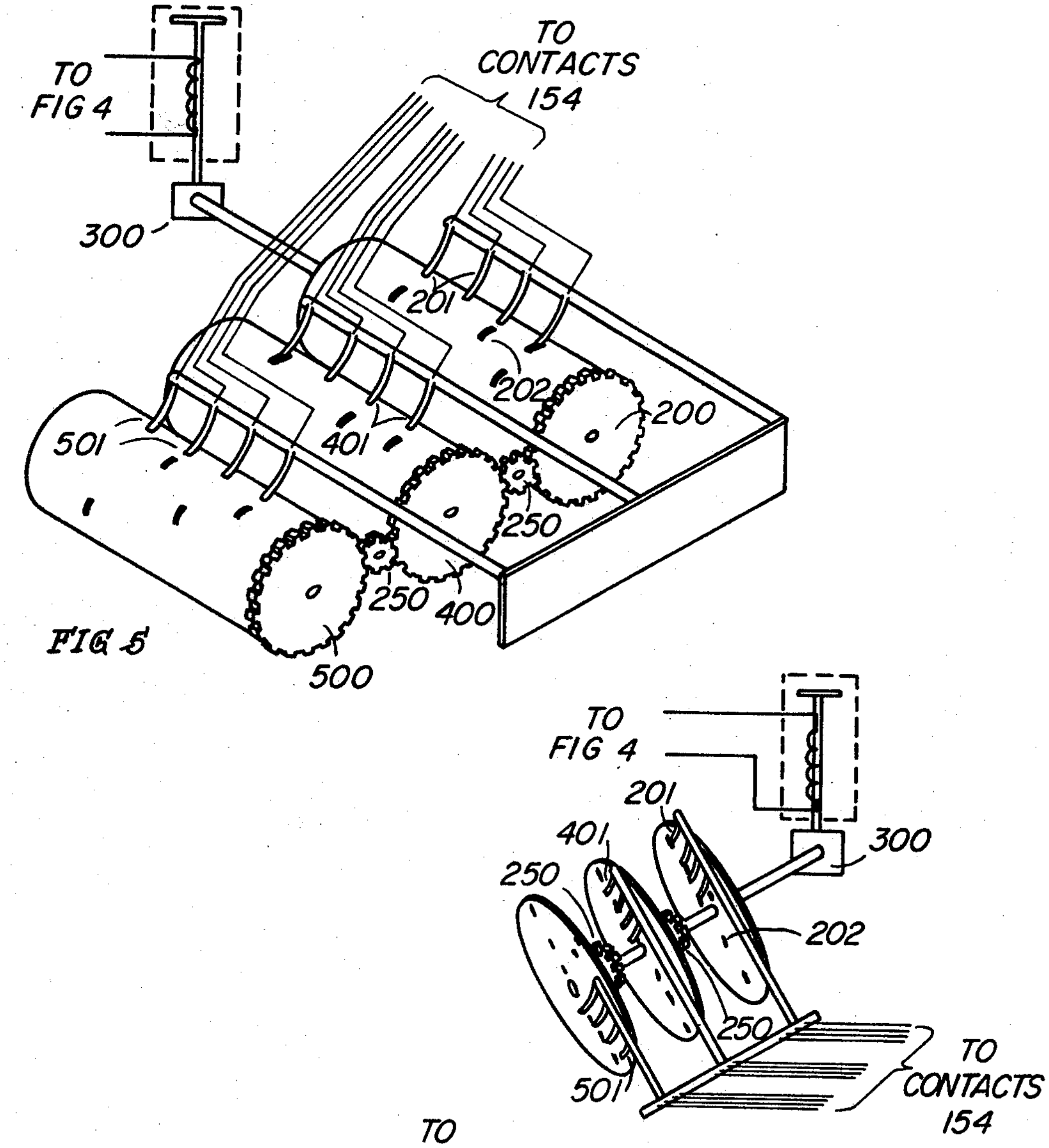
FIGURE 5 is a perspective view of simulator storage drums with brush switches.
FIGURE 6 is a perspective view of inexpensive disc type simulators used as an alternative to the showing in FIGURE 5.
Figure 7:
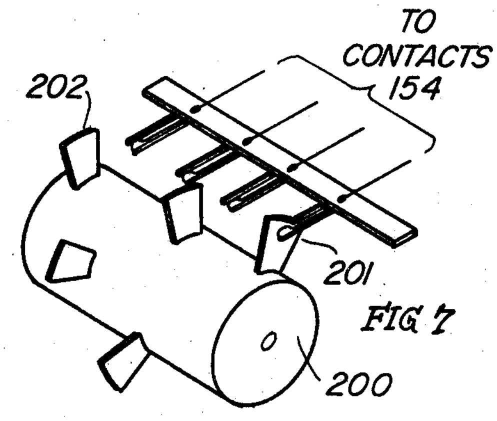
FIGURE 7 is a perspective view of a knife switch type of simulator storage drum, also used as a substitute for the arrangements shown in FIGURE 5 and FIGURE 6.
Figure 8:
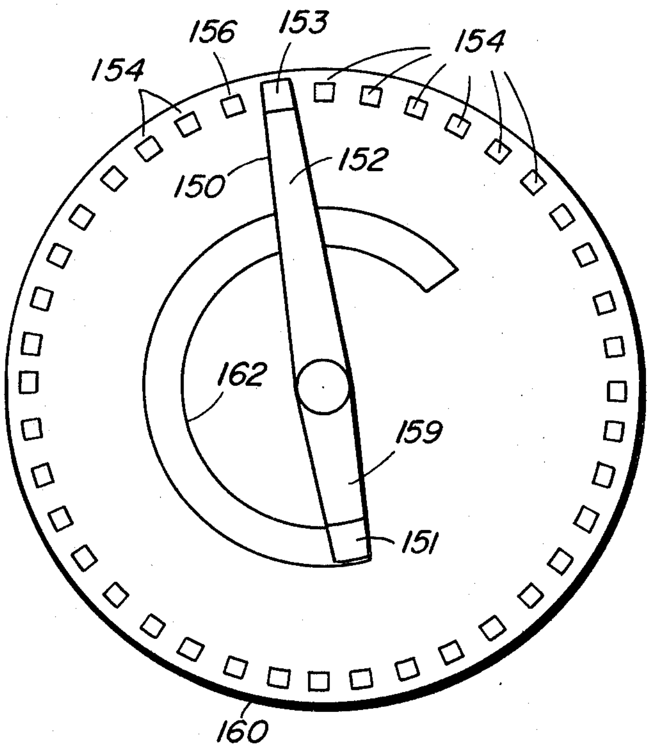
FIGURE 8 is a top view of the scanner wheel and scanner arm of the invention.
Figure 9:
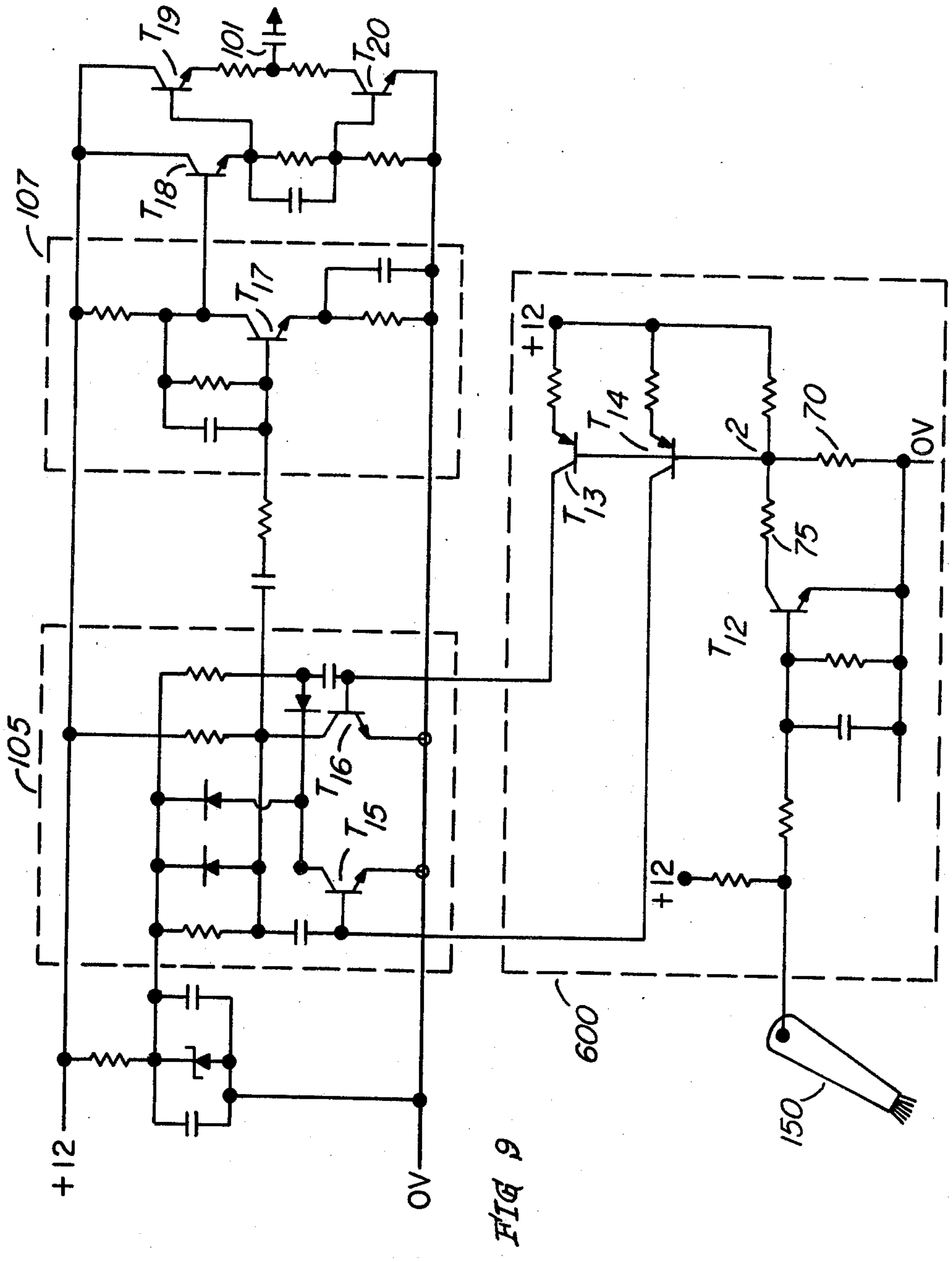
FIGURE 9 is a circuit diagram of the data output multivibrator, multivibrator output shaper and driver, and the multivibrator frequency control.

The contacts 154 on the scanner wheel are wired to simulator drums or discs (of the type shown in any of FIGURES 5, 6, and 7). For example, referring to FIGURE 5, brushes 201 are positioned to ride on units drum 200, which simulator drum is connected to a stepping relay 300 (diagrammatically shown in FIGURE 5) and contacts 202 are arranged on drum 200 in binary code fashion as heretofore described in this invention, the system of conversion of numeric data into binary code being common in the art. Units drum 200 is also connected by a gear train 250 (or other gear train that simulates the interconnection of the drums being read at the meter face 100) to tens drum 500, and brushes 401 and 501, respectively, ride on these drums and are connected to preselected contacts 154 on the scanner wheel. Normally, the four brushes of the units drum, and then of the tens drum, and then of the hundreds drum will be sequentially connected to contacts 154, then, when the pulse motor 6 starts to run, as previously described, and after brush 151 initiates the connection of the output of the device to the telephone line, the open, or closed, condition sensed by brushes 201, 401, and 501 at the simulator drums is transmitted to the corresponding contacts 154 on the scanner wheel and the open or closed condition of these contacts is sensed by brush 153 on portion 152 of the scanner arm and this condition is transmitted to a voltage divider 600 (shown in FIGURE 9) in which the base of transistor $T_{12}$ is connected to scanner arm portion 152 so that whenever a contact (ground) condition is sensed $T_{12}$ is turned off. Conversely, when an open (no contact) condition is sensed, $T_{12}$ returns to an "on" condition. Transistors $T_{13}$ and $T_{14}$ are interconnected to form a pair of constant current generators. The collector of $T_{12}$ is connected to a point 2 through a resistor 75. Another resistor 70 is also connected to point 2. When $T_{12}$ is turned off, the voltage rises at point 2 and hence the current generated by $T_{13}$ and $T_{14}$ is less than when $T_{12}$ is turned on. This causes a lower current output by transistors $T_{13}$ and $T_{14}$ which current drives the data output oscillator 105 which is composed of transistor $T_{15}$ and $T_{16}$ interconnected in a standard manner. Obviously, as the current input to $T_{15}$ and $T_{16}$ is varied the frequency of the data output oscillator 105 will be varied proportionately and the component values are selected to cause a significant variance in output frequency which will be acceptable for transmission over the telephone lines and easily discriminated at the central data recording center.

The output of the oscillator 105 is transmitted through a low pass filter amplifier stage indicated generally as 107, and also called the output shaper and driver, which incorporates transistor $T_{17}$ and is of a type commonly known in the art. This serves to change the square wave output of the data output oscillator to more of a rounded sine wave characteristic thereby rendering it compatible with telephone line transmission. Transistor $T_{18}$ is an emitter follower and is used to provide current gain to drive transistors $T_{19}$ and $T_{20}$. $T_{19}$ and $T_{20}$ comprise a dual emitter follower and serve to build pulse strength for the output signal for both the positive and negative portion of the output signal.

Figure 3:
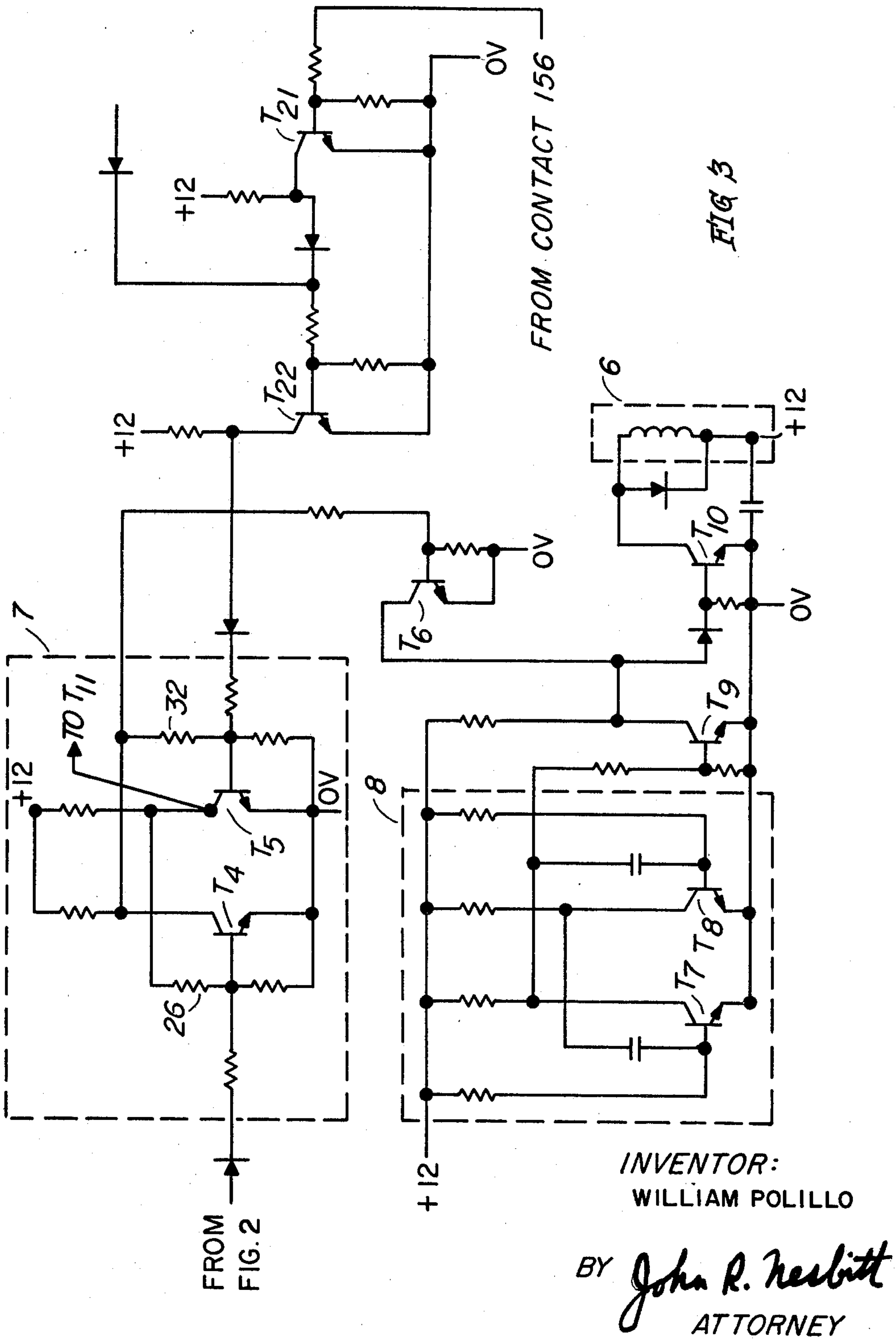
FIGURE 3 is a circuit diagram of the readout control flip-flop, motor control multivibrator and driver, and the reset circuit.

Capacitor 101 serves to block DC random input into the system from the telephone line. When brush 153 on the scanner arm has completed its scan and moved into contact with contact 156 on the scanner wheel, then the device is reset and ready for another interrogation. Reset occurs because contact 156 had been reflecting an "open" condition all during the scan and when brush 153 effects a closure with said contact, then a circuit is completed (as shown in FIGURE 3) to the base of transistor $T_{21}$. $T_{21}$ has been off, but upon receipt of the reset signal it switches on and this in turn switches $T_{22}$ off. When $T_{22}$ switches off, since its collector is connected to the base of $T_5$, $T_5$ is switched from off to on. This in turn switches $T_4$ into its original off condition ready for receipt of a proper interrogation signal as previously described. Simultaneously, when $T_4$ switches off, it switches $T_6$ on, thereby restoring the clamp on $T_9$ so that no output is passed to $T_{10}$ and pulse motor 6, thereby stopping the scanner arm.

The base of reset transistor $T_{22}$ is connected to the collector of $T_3$ so that it is switched upon a proper interrogation signal being received by the system so that the closure of brush 153 and contact 156 does not continue to disable operation of the system.

What is claimed as my invention is:

1. An automatic meter reader comprising: sensor means adapted to sense and convert meter mechanical indicator positional data into binary code; output multivibrator means; output multivibrator frequency control means interconnecting said sensor means and output multivibrator means and adapted to sense the binary encoded data and to change the output frequency of said output multivibrator from one frequency to another in response thereto and during interrogation thereof; and interrogation responsive means for initiating transmission of said meter mechanical indicator positional data upon demand and terminating said transmission upon completion.

2. The meter reader of claim 1 in which said sensor means includes: switch means adapted for actuation upon a predetermined positional change of a mechanical indicator incorporated in a meter; and mechanical storage means adapted for actuation by said switch means upon said predetermined positional change of said meter mechanical indicator, said mechanical storage means being adapted to simulate the mechanical indicator position of the meter indicator.

3. The meter reader of claim 1 wherein said sensor means includes a stepping relay actuatable by said switch and connected to said storage means and adapted to advance said storage means upon each actuation of said switch means.

4. The meter reader of claim 1 in which said sensor means includes a scanner wheel having spaced contacts, and in which said storage means includes spaced electrical contacts adapted for sequential closure; said sensor means further including predetermined electrical interconnections between said scanner wheel contacts and said storage means is converted into binary code representative of the mechanical position of said storage means according to which of said electrical connections are "open" and which are "closed"; said sensor means further including a scanner arm adapted to sequentially traverse said scanner wheel contacts whereby the open or closed condition of the said electrical interconnections between the scanner wheel contacts and storage means contacts is sensed; said scanner arm being connected to said frequency control means whereby the output multivibrator frequency is determined.

5. The meter reader of claim 4 wherein said sensor means also includes a conductive ring on said scanner wheel, said scanner arm also being adapted to make electrical contact with said ring during interrogation and to break contact with said ring upon reaching a predetermined position wherein it is desired to disconnect the meter reader from the interrogation source.

6. The meter reader of claim 1 including combined time delay and memory means adapted to lock out any change in the sensed condition of the meter mechanical indicator during connection of the meter reader to the interrogation device.

7. The meter reader of claim 1 wherein said output multivibrator frequency control means includes a pair of constant current generators adapted for variation between one or the other of predetermined current output levels dependent upon the condition sensed by the said sensor means whereby the frequency of said output multivibrator is varied between predetermined frequencies.

8. The meter reader of claim 1, wherein said sensor means includes mechanical indicators having binary encoded positional data incorporated therein.

9. The meter reader of claim 8 in which said sensor means includes a scanner wheel having spaced contacts, and in which said meter mechanical indicators are each adapted to sequentially make and break electrical interconnections with said scanner wheel spaced contacts; said sensor means further including a scanner arm adapted to sequentially traverse said scanner wheel contacts whereby the open or closed condition of each of said electrical interconnections between the meter mechanical indicators and scanner wheel contacts is sensed; said scanner arm being connected to said frequency control means whereby the output multivibrator frequency is determined.

References Cited

UNITED STATES PATENTS 1,919,992 7/1933 Stewart ------------ 340—151

JOHN W. CALDWELL, Primary Examiner

HAROLD I. PITTS, Assistant Examiner

U.S. Cl. X.R.

340—147, 150, 164, 171